(12) United States Patent
Mandiganal

(10) Patent No.: US 10,050,883 B2
(45) Date of Patent: Aug. 14, 2018

(54) MANAGING A WIRELESS MESH NETWORK

(71) Applicant: Honeywell International Inc., Morristown, NJ (US)

(72) Inventor: Santosh Mallikarjuna Mandiganal, Hubli (IN)

(73) Assignee: Honeywell International Inc., Morris Plains, NJ (US)

( * ) Notice: Subject to any disclaimer, the term of this patent is extended or adjusted under 35 U.S.C. 154(b) by 103 days.

(21) Appl. No.: 15/090,675

(22) Filed: Apr. 5, 2016

(65) Prior Publication Data
US 2016/0218981 A1    Jul. 28, 2016

Related U.S. Application Data

(62) Division of application No. 13/744,159, filed on Jan. 17, 2013, now Pat. No. 9,306,857.

(51) Int. Cl.
| H04L 12/803 | (2013.01) |
| H04L 12/801 | (2013.01) |
| H04L 12/811 | (2013.01) |
| H04L 12/825 | (2013.01) |
| H04L 12/835 | (2013.01) |
| H04W 24/00 | (2009.01) |

(52) U.S. Cl.
CPC ............ *H04L 47/122* (2013.01); *H04L 47/14* (2013.01); *H04L 47/17* (2013.01); *H04L 47/26* (2013.01); *H04L 47/29* (2013.01); *H04L 47/30* (2013.01); *H04L 47/38* (2013.01); *H04W 24/00* (2013.01)

(58) Field of Classification Search
CPC ..... H04L 47/266; H04L 47/26; H04L 47/143; H04L 51/14; H04L 47/30; H04L 47/32
See application file for complete search history.

(56) References Cited

U.S. PATENT DOCUMENTS

| 4,858,141 A | 8/1989 | Hart et al. |
| 5,483,153 A | 1/1996 | Leeb et al. |
| 6,937,946 B1 | 8/2005 | Culp et al. |
| (Continued) | | |

FOREIGN PATENT DOCUMENTS

| EP | 2290328 A1 | 3/2011 |
| WO | 2007064976 A1 | 6/2007 |
| (Continued) | | |

OTHER PUBLICATIONS

Exam Report and Annex from related European Patent Application No. 14150386.2, dated Jun. 8, 2016, 6 pp.
(Continued)

*Primary Examiner* — Andrew Chriss
*Assistant Examiner* — Voster Preval
(74) *Attorney, Agent, or Firm* — Brooks, Cameron & Huebsch, PLLC

(57) ABSTRACT

Methods, devices, and systems for managing a wireless mesh network are described herein. One method includes monitoring an outgoing data queue length of a node of a wireless network, determining that the outgoing data queue length exceeds a particular threshold, reducing a video quality associated with the outgoing data queue, and sending a notification to an additional node of the wireless network to reduce a video quality associated with an outgoing data queue of the additional node.

5 Claims, 3 Drawing Sheets

(56) References Cited

U.S. PATENT DOCUMENTS

| | | | |
|---|---|---|---|
| 2003/0012138 A1 | 1/2003 | Abdelilah et al. | |
| 2008/0056125 A1 | 3/2008 | Kneckt et al. | |
| 2009/0092046 A1* | 4/2009 | Naven | H04L 47/10 370/230 |
| 2009/0232001 A1 | 9/2009 | Gong et al. | |
| 2010/0098047 A1 | 4/2010 | Zhou et al. | |
| 2010/0165846 A1 | 7/2010 | Yamaguchi et al. | |
| 2010/0290441 A1 | 11/2010 | Stewart | |
| 2011/0164516 A1 | 7/2011 | Kalkunte et al. | |
| 2012/0044806 A1 | 2/2012 | Park et al. | |
| 2013/0163430 A1* | 6/2013 | Gell | H04N 21/23439 370/235 |
| 2013/0208593 A1* | 8/2013 | Nandagopal | H04L 47/00 370/232 |
| 2014/0025763 A1* | 1/2014 | Furlong | H04L 51/12 709/206 |
| 2014/0119193 A1* | 5/2014 | Anand | H04L 45/28 370/237 |
| 2014/0156734 A1* | 6/2014 | Stankoulov | G06F 9/00 709/203 |

FOREIGN PATENT DOCUMENTS

| | | |
|---|---|---|
| WO | 2011131984 A2 | 10/2011 |
| WO | 2012052868 | 4/2012 |

OTHER PUBLICATIONS

Exam Report from related European Patent Application No. 14150386, dated Jun. 8, 2016, 6 pp.

Hart, "Non-Intrusive Appliance Load Monitoring", Proceedings of the IEEE, vol. 80, No. 12, Dec. 1, 1992, 22 pp.

Du, et al, "A review of identification and monitoring methods for electric loads in commercial and residential buildings", Energy Conversion Congress and Exposition (ECCE), 2010 IEEE, Sep. 12, 2010.

Search Report from related European Patent Application No. 14150386, dated May 24, 2016, 5 pp.

* cited by examiner

MANAGING A WIRELESS MESH NETWORK

CROSS REFERENCE TO RELATED APPLICATION

This application is a divisional of U.S. application Ser. No. 13/744,159, filed Jan. 17, 2013, the entire specification of which is incorporated herein by reference

TECHNICAL FIELD

The present disclosure relates to methods, devices, and systems for managing a wireless mesh network.

BACKGROUND

In various wireless mesh networks (WMNs), such as wireless local area networks (WLANs), data streams may be affected by jitter and/or delay, increasing latency, for instance. Such increases may be magnified with larger node counts (e.g., hops) in the network. In situations where data streams include real-time data (e.g., audio and/or video), increased latency in the network may hinder and/or prevent real-time viewing, for instance.

Previous approaches to managing wireless mesh networks may implement carrier sense multiple access with collision avoidance (CSMA/CA) methods and/or mechanisms to reserve a wireless medium, for example. However, approaches using CSMA/CA may be unable to guarantee the medium reservation for a given node when needed. Additionally, if the wireless medium is not idle (e.g., another node reserved the medium), a node may wait for a random period of "backoff" time before being able to transmit data through the medium, for instance, increasing latency.

DETAILED DESCRIPTION

Figure 1:
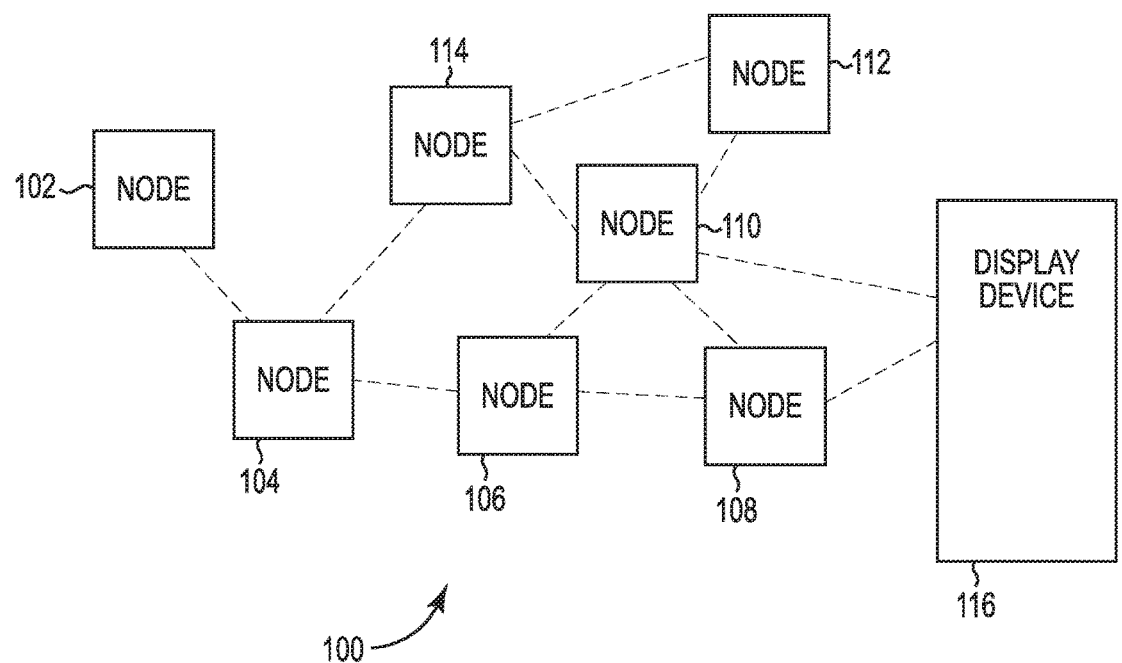
FIG. 1 illustrates a wireless mesh network in accordance with one or more embodiments of the present disclosure.

Methods, devices, and systems for managing a wireless mesh network are described herein. For example, one or more embodiments include monitoring an outgoing data queue length of a node of a wireless network, determining that the outgoing data queue length exceeds a particular threshold, reducing a video quality associated with the outgoing data queue, and sending a notification to an additional node of the wireless network to reduce a video quality associated with an outgoing data queue of the additional node.

Wireless mesh network management in accordance with one or more embodiments of the present disclosure can include adjusting video quality when confronted with network congestion, for instance. Various embodiments can provide longer wireless medium access and/or shorter delay for medium reservation as compared with previous motion detection approaches. Accordingly, embodiments of the present disclosure can allow the management of wireless mesh networks communicating real-time video feeds to one or more display devices using situational awareness and/or monitoring, for instance.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a wireless mesh network 100 in accordance with one or more embodiments of the present disclosure. Wireless mesh network 100 is sometimes referred to generally herein as network 100. As shown in FIG. 1, network 100 includes a node 102, a node 104, a node 106, a node 108, a node 110, a node 112, and a node 114 (sometimes referred to generally herein as nodes 102-114). Nodes 102-114 can be devices (e.g., wireless devices) in the network 100 capable of sending, receiving, and/or forwarding data and/or information over a communications channel (e.g., wireless medium). Network 100 is not limited to a particular number of nodes.

As shown in FIG. 1, network 100 can include a display device 116, though embodiments of the present disclosure are not limited to a particular number of display devices. Display device 116 can be and/or include various display technologies such as, for example, liquid crystal display (LCD), light emitting diode (LED) display, cathode ray tube (CRT) display, etc., and can display videos, data, and/or information to one or more users (e.g., a building map showing place of origin of video from various network nodes).

An example of a device embodying nodes 102-114 (referenced often herein as an example for illustration) can be a wireless video imaging device (e.g., video camera), for instance. It is noted, though, that embodiments of the present disclosure do not limit one or more of nodes 102-114 to a particular device. Video imaging devices (e.g., nodes 102-114) in accordance with embodiments of the present disclosure can act as nodes (discussed above) and/or capture video(s).

Network 100 can represent a rapidly deploying temporary surveillance network at a crime scene, disaster event (fire, natural disaster, etc.), public event, construction site, tunnel, and/or bridge, for example, among other networks. Network 100 can be used to gather situational awareness and/or to provide monitoring and/or control of an area. In an example, nodes 102-114 can be video cameras mounted on helmets, for instance, used by security personnel going inside a disaster site and enabling situational information to a responder (e.g., using display device 116).

Videos can be captured in various manners and/or using various technologies known to those skilled in the art. Video(s), as used herein, can include video feed(s), video stream(s), and/or video image(s), and is sometimes referred to as video data.

Video data can be communicated between nodes 102-114 and/or display device 116. Each of the nodes 102-114 can include a WLAN interface by which packet(s) of video data can be sent. Such interfaces can include an outgoing packet queue (e.g., outgoing data queue and/or send queue) which can vary in length according to, for example, quality of connection(s) between various nodes 102-114 and/or level(s) of congestion in the network 100.

When a video is captured, instructions and/or logic can be executed (discussed further below) by one or more of the nodes 102-114 to receive a Quality of Service (QoS) window for the video. Such a window can contain maximum and/or minimum value(s) for video data parameters such as, for example, frame rate, resolution and/or compression ratio. The window can be stored in memory (discussed further below) for the duration of the video, for instance.

As shown in FIG. 1, nodes 102-114 and/or display 116 can be organized in a mesh topology. Videos captured by node 102 can be routed to display device 116 though a path defined by a portion of the nodes 102-114 (e.g., node 104, node 106, and node 108), for instance.

In such a mesh topology, redundancy can allow communication within the network 100 in instances where a particular node may fail. For example, if node 106 fails, node 104 can send data to node 108 via node 114 and node 110. Wireless mesh networks in accordance with one or more embodiments of the present disclosure can be implemented with various wireless technologies such as, for example, 802.11, 802.15, 802.16, and/or cellular technologies, along with combinations of these and/or others.

In the following example, reference is made to a particular node (node 106) of network 100 for purposes of discussion and illustration; however, embodiments of the present disclosure are not limited to a particular node of the network 100.

Node 106 can utilize software, hardware, firmware, and/or logic to perform a number of functions. As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

Node 106 can monitor congestion of network 100 in an area around itself by, for example, monitoring a length of an outgoing video data queue (e.g., video data packet queue and/or interface queue) associated with node 106. The outgoing video data queue length can increase when video data packets are not being sent with sufficient frequency, if the wireless medium is in use, and/or if video data packets require retransmission, for instance.

Node 106 can determine that the outgoing data queue length exceeds a particular threshold. Such a threshold can be set by a user, for instance, and/or by a computing device based on various factors (e.g., desired time between video capture and viewing at display device 116).

Responsive to the threshold-exceeding outgoing data queue length being determined, for instance, node 106 can reduce a video quality associated with the outgoing data queue. Reduction of video quality can include reducing one or more of the video data parameters previously discussed (e.g., frame rate, resolution and/or compression ratio). Reduction can include reducing one or more of the video data parameters by a particular amount.

Node 106 can send a notification (e.g., "balance_video_quality") to an additional node (e.g., node 104) of the wireless network to reduce a video quality associated with an outgoing data queue of the additional node. Such a notification can be sent upstream, for instance. Upstream, as used herein, can refer to a direction away from a destination (e.g., display device 116) of video data in the network 100. With respect to node 106, for instance, "upstream nodes" can include nodes that route their outgoing video data through node 106. The notification can be sent by node 106 to multiple additional nodes (e.g., via one or more relay nodes). The notification can be sent to various (e.g., two or more) nodes upstream of node 106 (e.g., node 104 and node 102).

Continuing in the example, once node 104 receives the notification, node 104 can reduce its outgoing video quality in a manner analogous to that discussed above with respect to node 106. After a particular time period subsequent to the sending of the notification, node 106 can determine that its outgoing data queue length does not exceed (e.g., no longer exceeds) the particular threshold.

Responsive to such a determination, node 106 can increase the video quality associated with its outgoing data queue. Increasing the video quality can include increasing one or more of the video data parameters previously discussed. Increasing can include increasing one or more of the video data parameters by a particular amount. Increasing can include increasing the video quality at a particular interval. Increasing can include waiting a particular time period between incremental increases to determine whether the notification, previously discussed, is received from a downstream node (e.g., node 108). Node 106 can increase the video quality associated with the outgoing data queue until the notification is received and/or node 106 determines that the outgoing data queue length exceeds the particular threshold (e.g., as previously discussed).

If, for example, the outgoing video data queue length threshold remains exceeded after a particular time period has elapsed following node 106 reducing its outgoing video quality and sending the notification upstream, node 106 can send a delay notification (e.g., "delay_transmit"). The delay notification can be sent to nodes sharing a connection with node 106 (e.g., node 104, node 110, and/or node 108), for instance. Such nodes can be referred to as "neighboring nodes" of node 106. Node 106, having sent the delay notification, can be referred to as an initiator node (e.g., initiator imaging device).

A neighboring node (referred to in this example as node 104), having received the delay notification, can remove its captured video from its outgoing queue (e.g., cease placing new captured video data in its outgoing queue), freeing up bandwidth for node 106, for instance, and buffer its captured video in memory. Node 104 can receive video captured by node 106 and additionally buffer that received video in memory. Node 104 can aggregate its own buffered captured video and the buffered received video. The aggregated buffered captured video and the buffered received video can be sent by node 104 upstream (e.g., to node 102), for instance, and/or to its other neighboring nodes after receiving a start notification (discussed below).

When sufficient bandwidth is available, node 106 may determine that the length of its outgoing video data queue does not exceed (e.g., no longer exceeds) the particular threshold. Responsive to such a determination, node 106 can send a start notification (e.g., "start_transmit") to its neighboring nodes.

Having received the start notification from node 106, node 104 can resume routing the video data (e.g., the aggregated buffered captured video and the buffered received video). That is, node 104 can place the aggregated buffered captured video and the buffered received video in its outgoing queue in response to receiving the start notification from node 106. In various embodiments, after having received the start notification, node 104 can place captured (e.g., live and/or real-time) video in its outgoing queue. A decision regarding whether to place buffered video or live video in the outgoing queue can be made based on importance and/or priority of the video. For example, a user accessing display device 116 may desire live video in a certain situation, such as an emergency, over buffered (e.g., delayed) video. In other situations, delays in viewing may be irrelevant, for instance.

If, for example, the outgoing video data queue length threshold remains exceeded after a particular time period has elapsed following node 106 reducing its outgoing video quality, sending the notification upstream, and/or sending the delay notification, node 106 can send a reroute notification (e.g., "discover_reroute" and/or "change_route").

A reroute notification can be sent to a node proximate to the destination (e.g., display device 116) of video data in the network 100 (e.g., node 108). In various instances, subsequent to such a route change, node 106 can resume transmitting video data (e.g., the route change reduces the outgoing video data queue length). In other instances, if the outgoing video data queue length threshold of node 106 remains exceeded after a particular time period, node 106 can send a reroute notification to a next best neighbor node (e.g., node 110) proximate to the destination (e.g., display device 116) and can start transmitting video data (e.g., resume transmitting). A similar process can be repeated with all neighboring nodes to reach the destination until the outgoing video data queue length no longer exceeds the threshold.

Figure 2:
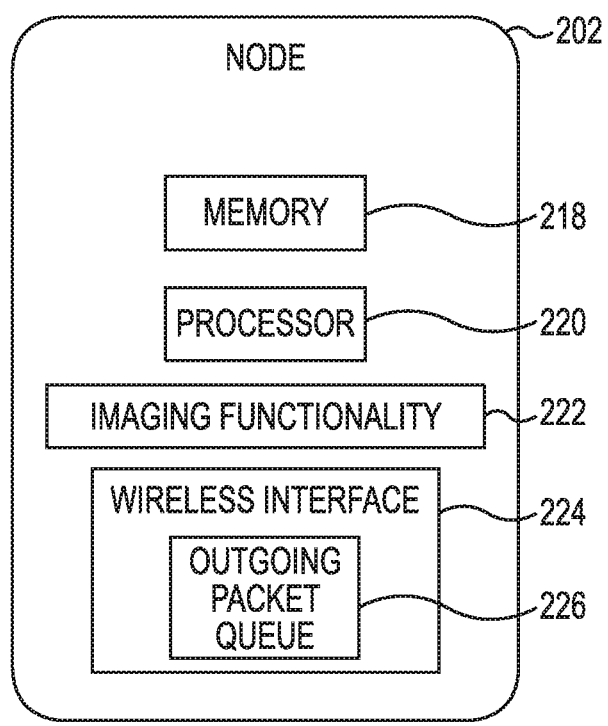
FIG. 2 illustrates a node of a wireless mesh network in accordance with one or more embodiments of the present disclosure.

FIG. 2 illustrates a node 202 of a wireless network mesh network in accordance with one or more embodiments of the present disclosure. Node 202 can be, for example, analogous to one or more of nodes 102-114, previously discussed in connection with FIG. 1.

As shown in FIG. 2, node 202 includes a memory 218 and a processor 220. Memory 218 can be any type of storage medium that can be accessed by processor 220 to perform various examples of the present disclosure. For example, memory 218 can be a non-transitory computer readable medium having computer readable instructions (e.g., computer program instructions) stored thereon that are executable by processor 220 to manage a wireless mesh network in accordance with one or more embodiments of the present disclosure.

Memory 218 can be volatile or nonvolatile memory. Memory 218 can also be removable (e.g., portable) memory, or non-removable (e.g., internal) memory. For example, memory 218 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 218 is illustrated as being located in node 202, embodiments of the present disclosure are not so limited. For example, memory 218 can also be located internal to another computing resource (e.g., enabling computer readable instructions to be downloaded over the Internet or another wired or wireless connection).

As shown in FIG. 2, node 202 can include an imaging functionality 222 configured to capture images and/or video(s). Imaging functionality 222 can be and/or include a video imaging device (e.g., video camera), and it is noted that embodiments of the present disclosure are not limited to a particular type of imaging functionality 222.

Node 202 can include a wireless interface 224 (previously discussed in connection with FIG. 1). Wireless interface 224 can be a network interface controller allowing node 202 to communicate wirelessly with other node(s) of a network (e.g., nodes 102-114 of network 100). Wireless interface 224 can, as previously discussed in connection with FIG. 1, include an outgoing data (e.g., packet) queue 226. Outgoing data queue 226 can vary in length according to network congestion level, for instance.

Figure 3:
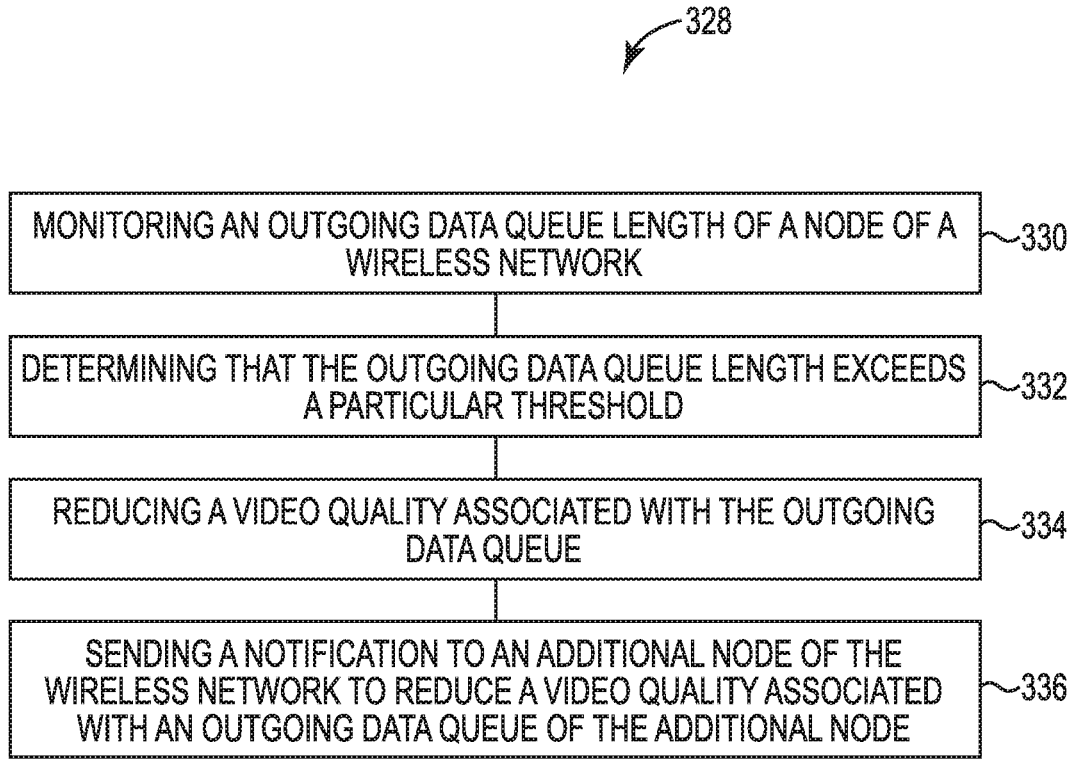
FIG. 3 illustrates a method for managing a wireless mesh network in accordance with one or more embodiments of the present disclosure.

FIG. 3 illustrates a method 328 for managing a wireless mesh network in accordance with one or more embodiments of the present disclosure. Method 328 can be performed by node 202, previously discussed in connection with FIG. 2, for instance, among other nodes (e.g., nodes 102-114) of network 100, previously discussed in connection with FIG. 1.

At block 330, method 328 includes monitoring an outgoing data queue length of a node of a wireless network. An outgoing data queue length (e.g., of a wireless interface of a node) can be monitored in a manner analogous to that previously discussed, for instance.

At block 332, method 328 includes determining that the outgoing data queue length exceeds a particular threshold. A threshold-exceeding data queue length can be determined in a manner analogous to that previously discussed in connection with FIG. 1, for instance.

At block 334, method 328 includes reducing a video quality associated with the outgoing data queue. In various embodiments, reducing the video quality can include reducing one or more parameters such as those previously discussed in connection with FIG. 1.

At block 336, method 328 includes sending a notification to an additional node of the wireless network to reduce a video quality associated with an outgoing data queue of the additional node. Such a notification can be sent in a manner analogous to that previously discussed, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An imaging device of a wireless network, the imaging device including a processor and memory configured to:
    capture a first video;
    place the captured first video in an outgoing queue;
    remove the captured first video from the outgoing queue and buffer the captured first video in a memory in response to receiving a delay notification from a downstream imaging device in the wireless network, the delay notification sent responsive to the downstream imaging device having an outgoing video queue length that exceeds a threshold;
    receive a second video from the downstream video imaging device;
    buffer the received second video in the memory;
    aggregate the buffered captured first video and the buffered received second video; and
    place the aggregated buffered captured first video and buffered received second video in the outgoing queue in response to receiving a start notification from the downstream video imaging device, the start notification sent responsive to the video queue length of the downstream imaging device no longer exceeding the threshold.

2. The device of claim 1, wherein the second video is captured by the downstream video imaging device.

3. The device of claim 1, wherein the second video is relayed by the downstream video imaging device.

4. The device of claim 1, wherein the imaging device is configured to place the captured first video in the outgoing queue before placing the aggregated buffered captured first video and buffered received second video in the outgoing queue in response to receiving the start notification.

5. The device of claim 1, wherein the imaging device is configured to place one of the captured first video and the aggregated buffered captured first video and buffered received second video in the outgoing queue in response to receiving the start notification based on a respective priority level associated with each of the captured first video and the aggregated buffered captured first video and buffered received second video.

* * * * *